Dec. 21, 1943.  O. P. WILLIAMS  2,337,142
MEAT AND FOWL TURNER AND LIFTER
Filed Nov. 25, 1941
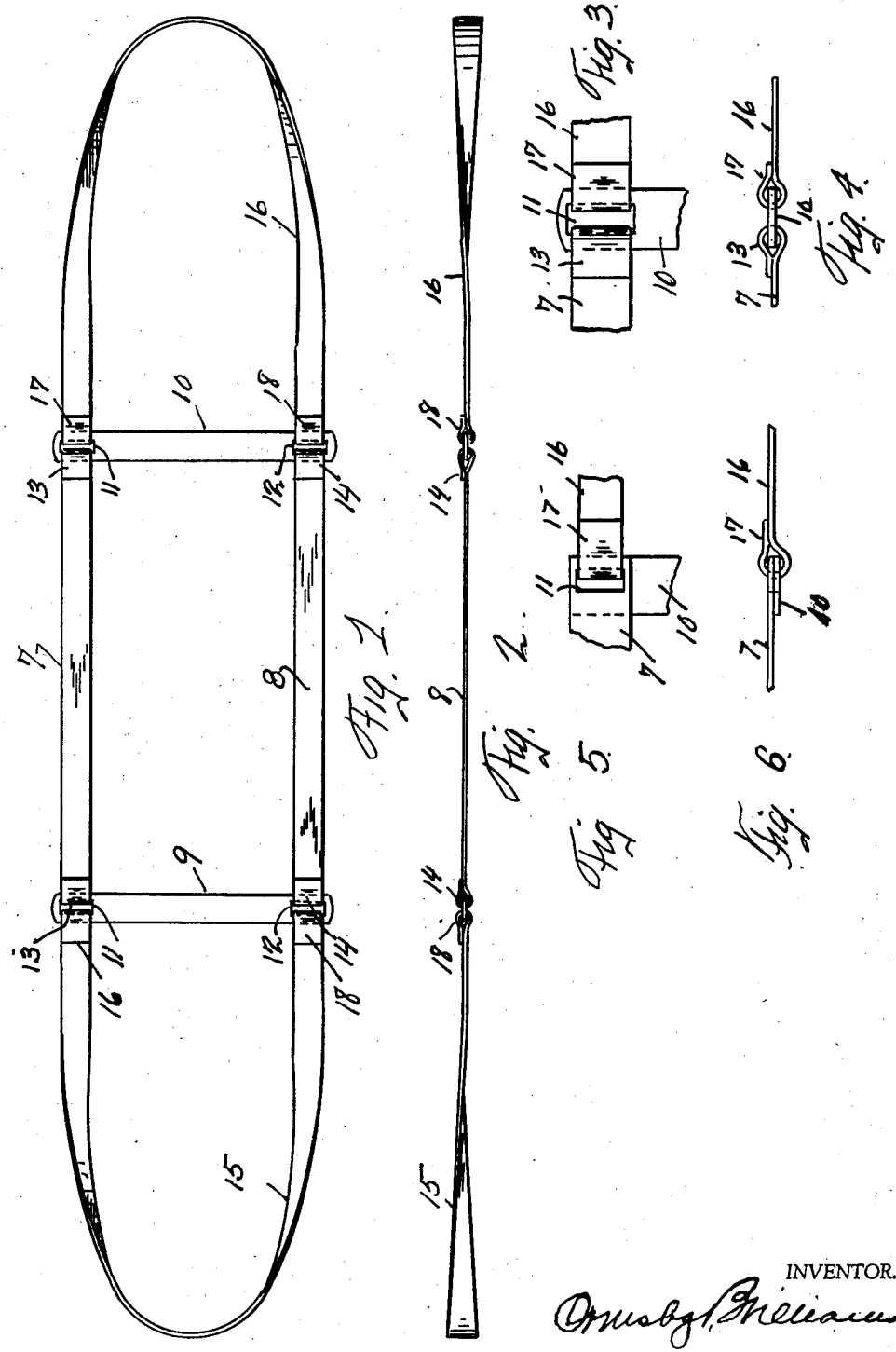
INVENTOR.

Patented Dec. 21, 1943

2,337,142

UNITED STATES PATENT OFFICE 2,337,142

MEAT AND FOWL TURNER AND LIFTER

Ormsby P. Williams, South Gate, Calif.

Application November 25, 1941, Serial No. 420,404

1 Claim. (Cl. 294—1)

This invention relates primarily to a device intended for use in roasting meat and fowl whereby the same may be turned, lifted and otherwise manipulated during the roasting process and also removed from the container without burning or otherwise injuring the hands of the user, and is an improvement over the structure described and claimed in my co-pending application filed Sept. 30, 1940, Serial No. 358,975, now Patent No. 2,272,314 issued Feb. 10, 1942, for Meat and fowl lifter and turner, reference being hereby made thereto for the basic details thereof:

In the drawing accompanying and forming a part hereof:

Fig. 1 is a top plan of my improved device in its extended position.

Fig. 2 is an edge view of Fig. 1.

Fig. 3 is an enlarged fragmentary plan of a portion of my device.

Fig. 4 is an edge view of Fig. 3.

Fig. 5 is an enlarged fragmentary detail of a modified form of construction of portion of my device.

Fig. 6 is an edge view of Fig. 5.

Referring to the drawing my improved device comprises a central rectangular frame consisting of the side members 7 and 8, and the end or cross members 9 and 10, the cross members 9 and 10 being provided with longitudinally extending slits 11 and 12 near their ends, and the side members 7 and 8 being provided with eyes 13 and 14 at their ends, which eyes are loosely positioned within the slits 11 and 12. Bails 15 and 16 have their free ends provided with eyes 17 and 18 and mounted within the slits 11 and 12 opposite the eyes 13 and 14 whereby said bails extend in lengthwise alinement with the central frame. All of the members are preferably formed from resilient material, preferably stainless steel or the like and ribbon like in structure.

In use my device is first laid in its extended position, either upon a table or other flat surface, or across the roasting or baking container, and the fowl or roast placed thereupon.

The handles or bails are then grasped by the user and the device lifted, the material being resilient shaping itself to the contour of the roast or fowl and both placed in the container with the bails folded over the upper portion of the meat or fowl.

To turn the roast or fowl, the handles are grasped by the user and one or the other elevated causing the content to roll towards the other or lower handles. The operation of removing the roast or fowl from the container is obvious.

The end or cross members 9 and 0 are preferably nonflexible or rigid but they may have some degree of flexibility without interfering with the efficient operation of my device, just so long as they are sufficiently rigid to not yield inwards.

Having described my invention what I claim is:

A device of the character described comprising a central rectangular frame formed of ribbon like material, a bail formed of ribbon like material mounted at each end of the frame and having the ends of its legs hingedly connected to said frame to extend in lengthwise alignment therewith, forming a hand hold for the user.

ORMSBY P. WILLIAMS.